Aug. 3, 1954
M. M. KARR
2,685,132
PORTABLE MILK COOLER
Filed Aug. 22, 1949
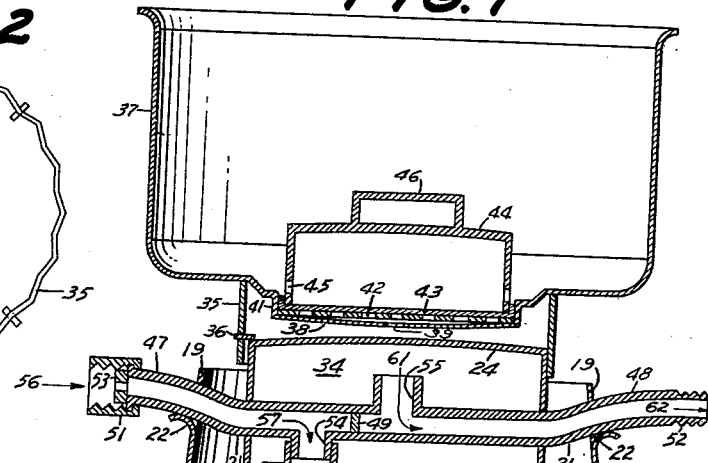
FIG. 1
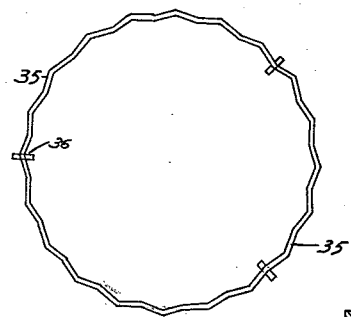
FIG. 2
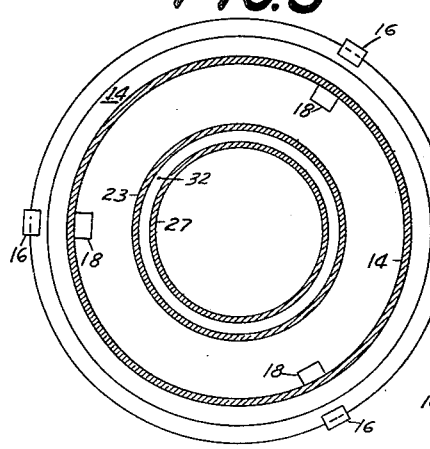
FIG. 3
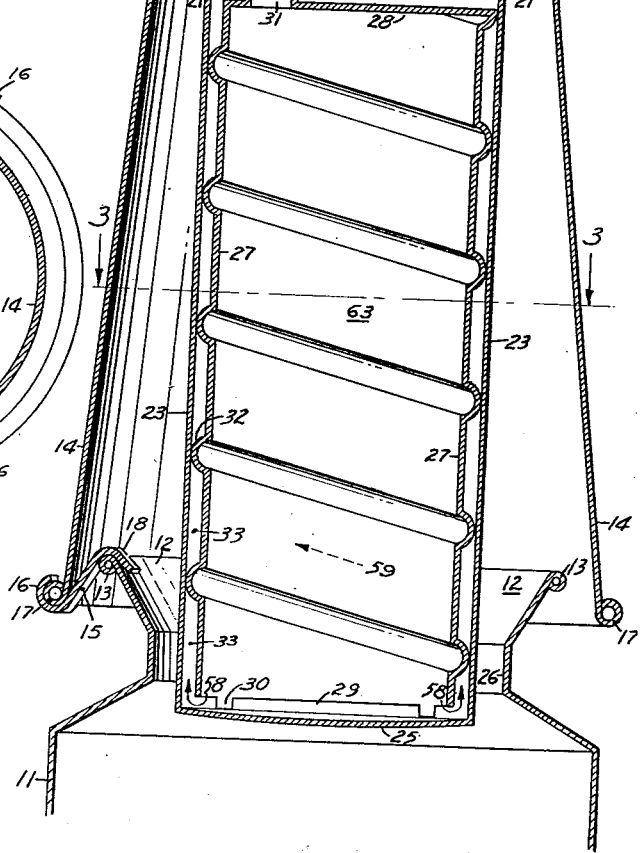
INVENTOR.
MOSES M. KARR
BY
*S. E. Simish*
ATTORNEY Patented Aug. 3, 1954

2,685,132

UNITED STATES PATENT OFFICE 2,685,132

PORTABLE MILK COOLER

Moses M. Karr, Oneida, Wis.

Application August 22, 1949, Serial No. 111,655

7 Claims. (Cl. 31—4)

My invention relates to a portable milk cooler. While this invention is believed to have its widest application in the cooling of milk, shortly after the milk has been drawn from the animal, it is nevertheless intended to be adapted for heat-exchange purposes generally, whether it be for heating or cooling.

Because of its wide application in the cooling of milk, I have illustrated my device as applied to a conventional milk can, and herein use the term "milk" to cover broadly milk, cream and any other fluid suitably treated by means of an embodiment of the present invention.

The purpose of this invention is to provide an improved milk cooling device especially adapted to use on small dairy farms whereon more extensive equipment is impractical, and the water supply is limited.

It is an object of this invention to provide a simple, efficient and inexpensive milk cooling apparatus.

It is another object of this invention to provide an improved structure adapted to be readily taken down for cleaning, and having parts of such character as to be readily and thoroughly cleaned thereby resulting in the maintenance of sanitary conditions.

It is still another object to provide a novel distributor for distributing the milk over the cooling surfaces in a film-like condition.

It is yet another object to provide a milk-cooling structure that allows air to freely circulate upward against a film of downwardly moving milk, during its cooling treatment, thereby aerating the milk and otherwise carrying off and eliminating objectionable odors in the milk.

It is a further object to provide a milk cooling structure having part of the coolant conducting means designed to also serve as handles for lifting the structure thereby.

It is a still further object to provide a milk-cooling structure having self-adjusting, supporting lugs adapted to fit milk cans of various diametral openings.

It is another object to provide a milk cooling structure having coolant circulating means as an integral part of one of the structure members.

It is yet another object to provide a milk cooling structure having a fixed orifice to control the flow of the coolant therethrough.

It is still another object to provide a milk cooling structure having a critical portal area for the control of milk flowing therethrough.

It is a still further object to provide a milk cooling structure embodying an air chamber for absorbing the water surge incident to a pulsating supply of coolant, for providing a lightweight construction and for providing a cooling structure that "finishes off" the milk with the coldest possible water.

Other objects and many of the attendant advantages of this invention will be readily appreciated as the same becomes better understood by reference to the following detailed description when considered in connection with the accompanying drawings in which like reference numerals designate like parts throughout the figures thereof, and wherein:

Fig. 1 is a full sectional view of a preferred embodiment of the invention;

Fig. 2 is a plan view of the milk distributor showing its corrugated construction; and Fig. 3 is a cross-sectional view taken along line 3—3 of Fig. 1, omitting the milk can.

Referring now to the drawing wherein like reference characters designate like or corresponding parts throughout the several views, there is shown in Fig. 1 (which illustrates a preferred embodiment) a standard conventional milk can 11 having an outwardly flared mouth 12 with a lip or rolled top edge 13.

Carried on top of said milk can is an open-ended, truncated cone casing 14 mounted thereon by means of three equally spaced inwardly projecting lugs 15 having one end 16 press-fit around the lower rolled edge 17 of casing 14, and the other end 18 in hooked engagement with lip or rolled top edge 13 of said milk can 11. It is to be noted that lug end 16 does not completely encompass the rolled edge 17, but only sufficiently in excess of 180° as to provide attachment thereto, thereby providing a pivotal or hinged arrangement of the lug relative to the rolled edge, and resulting in a self-adjusting lug adapted to fit milk cans of various diametral openings. The top end of said casing 14 is provided with a pair of diametrically opposite U-shaped slots 19 to receive a horizontally disposed coolant tube 21 hereinafter described. The material at the closed end of said slot may be rolled outwardly as at 22 and be otherwise saddle-formed to fit the configuration of said tube 21, thereby providing an adequate bearing surface for said tube 21, and hand engaging lugs for transferring the cooling unit from can to can.

The cooling unit comprises a drum or elongated hollow cylinder 23 having top end closure 24 and bottom end closure 25. In the preferred arrangement, the diameter of cylinder 23 is somewhat less than the diameter of the milk can neck 26 into which the cylinder is extended. However, it is obvious that the cylinder need not extend into the neck of the can, but can be of a length terminating above the neck, and of a diameter somewhat less than the diameter of the top edge of mouth 12 so that cooled milk dropping from the cooling unit periphery will at least drop onto the flared wall portions of the mouth and thence flow into the can proper.

The top end closure 24 is dome shaped to allow milk supplied at its crest to flow downwardly thereover in all directions in a thin sheet.

Within the cylinder 23 is placed a concentrically spaced second drum or hollow cylinder 27 somewhat shorter than cylinder 23, and having a top end closure 28 but an open bottom end 29. Said open end portion has its edge cut to form three projecting lug legs 30, which serve the dual purpose of supporting the cylinder 27 on the bottom end closure 25 of cylinder 23, and of providing open passage spaces between said legs for the flow of liquid from cylinder 27 to the space 33 between cylinders 27 and 23. The difference in length of cylinders 23 and 27 provides a chamber 34 between the tops thereof.

A flanged inlet opening 31 is provided in the top end closure of said cylinder 27. The wall portions of cylinder 27 are formed with an outwardly projecting helical corrugation or thread 32 integral with and a part of said wall portions. Said helical thread is formed by forcing a half-round instrument against the inner periphery of cylinder 27 and tracing a helical path thereon. The helical corrugation is of a projecting dimension to fit snugly against the inner periphery of cylinder 23 thereby forming the narrow helical flow passage 33 from the open end 29 to top chamber 34. Any cooling medium introduced into cylinder 27 is caused to travel helically in a tortuous or serpentine path through the passage 33 to the outlet chamber 34 in order thus to afford a maximum cooling effect upon any liquid sheet traversing the outer periphery of cylinder 23.

Slipped over the top of cylinder 23 is a corrugated sleeve distributor 35 snugly fitting thereover and provided with three equally spaced stops 36 to limit the positionment of said distributor relative to said cylinder 23. In addition to the positionment limiting function the stop also functions to engage with the top of cylinder 23 thereby providing an arrangement for supporting a strainer hereinafter described.

The strainer consists of a container 37 having an open top end and a concave bottom closure 38 having a central aperture 39. In my preferred construction the aperture has an area of 0.25 square inch which will accommodate the capacity of two mechanical milking units.

The bottom portion of the container has a reduced diameter portion 41 which is received within distributor sleeve 35. Within said reduced portion 41 and supported around the rim of said concave 38 is a perforated disc 42 whose primary function is to support a gauze filter pad 43 thereover.

A retaining bell 44, having a slightly smaller diameter than the reduced diameter portion 41, press-fits the filter gauze into said reduced portion 41 until the gauze bears against the supporting disc 42. Said bell 44 is provided with a ring of holes 45 to allow milk from the container 37 to flow onto the filter gauze. A handle 46 is provided on the bell 44 for manipulation thereof.

Coolant tube 21 comprises a cooling water inlet portion 47 and a cooling water outlet portion 48, with a plug element 49 therebetween. Said coolant tube 21 is disposed laterally through the upper end walls of cylinder 23, and through chamber 34 therein. Its end portions are supported in the saddles 22. The coolant tube 21 is suitably soldered in water-tight engagement to the walls of cylinder 23.

The end portions 47 and 48 are provided with threaded connectors 51 and 52, and adapted to be connected to a supply of coolant and a waste connection, respectively. In the inlet connector 51 is placed an orifice element 53 of a preselected cross-sectional area dependent upon the degree of cooling desired, and each dairy farm's particular hydraulic circumstances.

That part of the inlet portion 47 within chamber 34 is provided with a flanged opening 54 the flange of which is in press-fit engagement with-flange of opening 31 thereby providing in the flange of opening 31 thereby providing water-tight communication between said inlet 47 and cylinder 27.

That part of outlet portion 48 within chambers 34 is provided with a flanged opening 55, communicating between chamber 34 and said outlet 48, for allowing the spent cooling water to be discharged.

In my preferred embodiment the pipe end portions 47 and 48 of coolant tube 21 are turned upwardly to prevent milk from leaking away along said pipe ends. Furthermore, these pipe end portions are of sufficient length to serve as handles for lifting the cooling unit to and from the casing saddles 22.

In operation, cooling water is admitted into the inlet pipe 47 through orifice 53 as indicated by arrow 56. Thence the water flows into cylinder 27 through means of coacting flanged openings 31 and 54, as indicated by arrow 57. From the drum 27 the water flows out through the spaces between legs 30 and into the space 33 between the concentrically spaced cylinder 23 and 27, as indicated by arrow 58. Thence the cooling water proceeds helically up the space 33 to chamber 34, as indicated by dotted line arrow 59. From thence it spills into flanged opening 55, as indicated by arrow 61, and into the outlet pipe 48 and to waste, as indicated by arrow 62.

The warm animal milk flows from the container 37, through the ring of apertures 45, and onto filter pad 43 through which it is filtered and passed to the concave end closure 37. From thence it discharges through aperture 39 onto dome shaped end closure 24 and flows downwardly and outwardly thereon to the corrugated distributor 35.

The distributor corrugations separates the bulk milk into tiny rivulets around the top periphery of the cooling cylinder 23 which soon spread out into a uniform thin sheet which courses downwardly over the cool periphery of cylinder 23 and drops into milk can 11 as cooled milk.

It is to be noted that during the operation the cooling water will rise practically to the top of cylinder 23, that is, somewhat beyond the top of flanged opening 55 through which it spills into outlet pipe 48; whereas the water in cylinder 27 will rise only a short distance, providing a water seal for air entrapped in the air chamber 63 thereabove. This air chamber 63 results in a very light construction, unburdened by a large volume of water that would otherwise fill the cylinder completely; and it also results in a utilization of an entrapped volume of air at the upper end of the milk cooling cycle for insulation purposes. It is obvious that if said cylinder 27 were completely filled with water, the water, as a comparatively superior absorbing medium, would absorb some of the heat of the milk at the upper end of the milk cooling cycle, become somewhat warmed, and preclude the utilization of the coldest possible water at the lower end of the milk cooling cycle where the coldest water is desirable for "finishing off" the milk just before it drops into the milk can.

The purpose of my construction is to provide a simple efficient and inexpensive milk cooling apparatus embodying a novel distributor 35, a novel handle structure 47, 48 for lifting the cooling unit about, novel self-adjusting supporting lugs 15, novel water circulating means 32, a novel structure that allows aeration of a thin film of milk as it is being cooled on the exposed outside periphery of cooling unit 23, and a novel supporting casing 14 which defines and encloses a circulatory path for said aerating atmosphere.

It should be understood, of course, that the foregoing disclosure relates to only a preferred embodiment of the invention and that numerous modifications or alterations may be made therein without departing from the spirit and the scope of the invention as set forth in the appended claims.

What is claimed and desired to be protected by Letters Patent of the United States is:

1. A liquid cooling apparatus, comprising: a first upstanding cooling drum having top and bottom closure plates; a second drum having a top closure plate coaxially disposed within said first drum and spaced therefrom to form a comparatively narrow annular chamber between side walls thereof, and endwise disposed to form an outlet chamber between the top closure plates of said drums, the bottom portion of said second drum being constructed to be in open communication with said first drum, and said second drum having an integrally formed helical corrugation coacting with said first drum to define a helical passage through said annular space; a removable corrugated sleeve distributor snugly engaged around the upper end portion of said first drum, and projecting thereabove to form a reservoir; inlet means having a fixed orifice communicating with said second drum for conducting coolant liquid thereto, and outlet means communicating with said outlet chamber for conducting coolant liquid therefrom, said inlet and outlet means comprising a tubular member disposed through said outlet chamber and projecting therebeyond to form handles; and an open ended casing surrounding said drum and spaced therefrom a sufficient distance to allow the free circulation therebetween of a quantity of aerating atmosphere, said casing supportingly engaging said handles, and provided with hinged means adapted to engage with the lip of a milk can to support the casing thereon.

2. A liquid cooling apparatus, comprising: a first upstanding cooling drum; a second drum disposed within said first drum and spaced therefrom to provide an annular chamber, the bottom portion of said second drum having an opening communicating with the interior of said first drum, said second drum having a helical rib coacting with wall portions of the first drum to define a helical passage through said annular space; a removable longitudinally corrugated sleeve snugly engaged around the top end portion of said first drum, the corrugation folds of the sleeve and side wall portions of said first drum defining ducts, said sleeve projecting above said top end portion and cooperating with the top end closure of said first drum to define a reservoir communicating with said ducts; inlet means communicating with said second drum; outlet means communicating with said annular chamber; and an open ended casing surrounding said first drum and spaced therefrom a sufficient distance to allow the free circulation therebetween of a quantity of aerating atmosphere, said casing ends being open to the atmosphere; and means connecting said first drum and casing for supporting said drum on said casing.

3. A liquid cooling apparatus, comprising: a first upstanding cooling drum; a second drum disposed within said first drum and spaced therefrom to form an annular chamber, the bottom portion of said second drum having an opening communicating with said annular chamber; means for circulating a cooling medium into said second drum and out from said first drum; and a removable longitudinally corrugated sleeve snugly fitted around the top end portion of said first drum, the corrugation folds of the sleeve and side wall portions of said first drum defining ducts, said sleeve having a portion thereof extending above the top end of said first drum and cooperating with the top end closure of said first drum to define a reservoir communicating with said ducts.

4. A liquid cooling apparatus, comprising: a first upstanding drum; a second drum disposed therein and spaced therefrom to form an annular chamber, the bottom portion of said second drum having an opening communicating with the interior of said first drum; liquid inlet means communicating with said second drum; liquid outlet means communicating with said first drum; and a corrugated sleeve snugly engaged around the top end portion of said first drum, the corrugation folds of said sleeve and side wall portions of said first drum defining ducts, said sleeve having a portion thereof extending away from said first drum and cooperating with wall portions of said first drum to define a reservoir communicating with said ducts.

5. The apparatus of claim 4 and an open-ended casing surrounding said first drum and spaced therefrom a sufficient distance to allow the circulation therebetween of an adequate aerating atmosphere, said casing ends being open to the atmosphere; and means connecting said first drum and said casing for supporting said drum on said casing.

6. The apparatus of claim 5 and means on said casing adapted to engage with the lip of a container, said means being adjustable to accommodate various lip openings.

7. The apparatus of claim 5 wherein the casing supportingly engages said inlet and outlet means.

References Cited in the file of this patent

UNITED STATES PATENTS

| Number | Name | Date |
|---|---|---|
| 528,463 | Busch | Oct. 30, 1894 |
| 638,932 | Macafee | Dec. 12, 1899 |
| 855,371 | White et al. | May 28, 1907 |
| 1,360,869 | Beliveau | Nov. 30, 1920 |
| 1,511,722 | Dickerman | Oct. 14, 1924 |
| 1,639,857 | Planski | Aug. 23, 1927 |
| 1,664,704 | Ramgren | Apr. 3, 1928 |
| 1,692,760 | Ortiz | Nov. 20, 1928 |
| 1,861,898 | Raven-Rosenbaum et al. | June 7, 1932 |
| 1,906,450 | Demers | May 2, 1933 |
| 2,031,274 | McKay | Feb. 18, 1936 |
| 2,193,141 | Price | Mar. 12, 1940 |
| 2,315,426 | Hedrick | Apr. 13, 1943 |

FOREIGN PATENTS

| Number | Country | Date |
|---|---|---|
| 11,924 | Great Britain | May 13, 1897 |
| 16,254 | Denmark | July 17, 1912 |
| 288,352 | Germany | Oct. 20, 1915 |
| 178,878 | Great Britain | Apr. 24, 1922 |